United States Patent [19]

Bunyan

[11] Patent Number: 4,773,146

[45] Date of Patent: Sep. 27, 1988

[54] MULTI-STUD TENSIONERS

[75] Inventor: Thomas W. Bunyan, London, England

[73] Assignee: Pilgrim Engineering Developments, Ltd., Walsall, England

[21] Appl. No.: 940,757

[22] PCT Filed: Mar. 6, 1986

[86] PCT No.: PCT/GB86/00125

§ 371 Date: Nov. 6, 1986

§ 102(e) Date: Nov. 6, 1986

[87] PCT Pub. No.: WO86/05309

PCT Pub. Date: Sep. 12, 1986

[51] Int. Cl.⁴ .............................. B23Q 17/00
[52] U.S. Cl. ...................... 29/407; 29/446; 29/525.1; 81/57.38
[58] Field of Search ............ 29/407, 446, 526 R, 29/240, 252; 81/57.39, 53.2, 57.38; 285/18, 363

[56] References Cited

U.S. PATENT DOCUMENTS

| 2,866,370 | 12/1958 | Beach | 29/252 UX |
| 4,047,456 | 9/1977 | Scholz | |
| 4,162,573 | 7/1979 | Payne | 29/407 X |
| 4,179,786 | 12/1979 | Eshghy | 29/407 |
| 4,224,843 | 9/1980 | Heiermann et al. | 81/57.38 |
| 4,375,123 | 3/1983 | Ney | 29/407 |
| 4,413,396 | 11/1983 | Wallace et al. | 29/407 |

FOREIGN PATENT DOCUMENTS

| 1196287 | 11/1959 | France . |
| 2519161 | 1/1983 | France . |
| 0116488 | 8/1984 | France . |
| 2032822 | 5/1980 | United Kingdom . |
| 949685 | 2/1984 | United Kingdom . |

Primary Examiner—Charlie T. Moon
Attorney, Agent, or Firm—Woodcock Washburn Kurtz Mackiewicz & Norris

[57] ABSTRACT

A method and apparatus for tensioning groups of studs to a predetermined strain. The method includes the steps of tensioning all of the studs simultaneously to a predetermined tension, tightening working nuts, releasing the tension on the studs, measuring the residual strain on the studs and determining for which studs the strain is outside a predetermined tolerance range, retensioning the studs to a tension greater than the predetermined tension, rotating the nuts for the studs which are outside the predetermined residual strain tolerance range in step by amounts and in directions corresponding to the amount and direction in which the strain deviates from the predetemined value and releasing the tension on the studs.

2 Claims, 8 Drawing Sheets

MULTI-STUD TENSIONERS

The present invention relates to a method and apparatus for tensioning groups of studs. It is particularly applicable to the tensioning of the studs used for securing the covers on nuclear power reactors.

Nuclear power reactors are normally opened up and closed down about once a year for refuelling. The operation is hazardous because of the high levels of gamma radiation in the pit containing the reactor pressure vessel. These radiation levels may be of the order 200 millirems per hour. In many countries, the level of radiation to which workers can be subjected is limited by law. In the United Kingdom, for example, the limit is 2 rem per annum. Thus it can be seen that each worker can only operate in the pit of the reactor pressure vessel for about 10 hours per year.

The cost of each man-rem exposure is therefore very high and considerable cost savings could be achieved if the number of man hours taken at the high radiation level during refuelling could be reduced.

900 MW to 1500 MW pressurised water reactors typically have 54 studs of from 6 inch (15 cm) to 7½ inch (19 cm) diameter securing the cover for the reactor pressure vessel. These studs are usually tensioned and de-tensioned during refuelling using three or four manually-operated single stud tensioners. The tensioning and detensioning operations have to be performed on the 54 studs according to a prescribed pattern in order to avoid damaging the seal between the cover and the reactor vessel. In the hot environment the operation is laborious and time consuming.

According to the present invention in a first aspect there is provided a method of tensioning a group of studs to a predetermined strain, comprising the steps of:
a. tensioning all the studs simultaneously;
b. tightening working nuts;
c. releasing the tension on the studs;
d. measuring the strain on the studs and determining for which studs the strain is outside a predetermined tolerance range;
e. retensioning the studs;
f. simultaneous rotating the nuts for the studs which are outside the predetermined tolerance range in step by amounts and in directions corresponding to the amount and direction in which the strain deviates from the predetermined value;
g. releasing the tension on the studs.

According to the present invention in a second aspect there is provided a tensioning device comprising a tension bar adapted to be screwed on a stud, and mounted for rotation in a thrust block, hydraulic means for tensioning the tension bar by way of the thrust block, and support means for transmitting the reaction to a workpiece, characterised in that the tension bar is accommodated in a bore in the support means.

According to the present invention in a third aspect there is provided a tensioning device including stud tensioning means and working nut rotating means in which the working nut rotating means includes a dog clutch ring, the dogs of the dog clutch ring being resiliently mounted.

According to the present invention in a fourth aspect there is provided a method of forming a channel between two surfaces comprising locating two lengths of elastomeric material spaced apart and side by side in grooves across at least one of the surfaces, compressing in a longitudinal direction lengths of elastomeric material in bores communicating with the grooves to cause the lengths of elastomeric material to shorten and expand laterally to form seals between the two surfaces, thus defining the channel between the lengths of elastomeric material in the grooves.

Embodiments of the invention will now be described, by way of example, with reference to the accompanying drawings of which.

Referring to the drawings, a cover 11 of a reactor pressure vessel of a pressurised water reactor is secured to the vessel body (not shown) by 54 closely-pitched studs 12 (disposed in a circle). The studs pass through holes 13 in a peripheral flange of the cover and into tapped holes in a peripheral flange (not shown) of the body of the reactor vessel. The studs are normally maintained under tension by means of working nuts 14 which are seated on self-aligning washers 15.

The studs have short screwed extensions 16 projecting above the working nuts 14.

Figure 1:
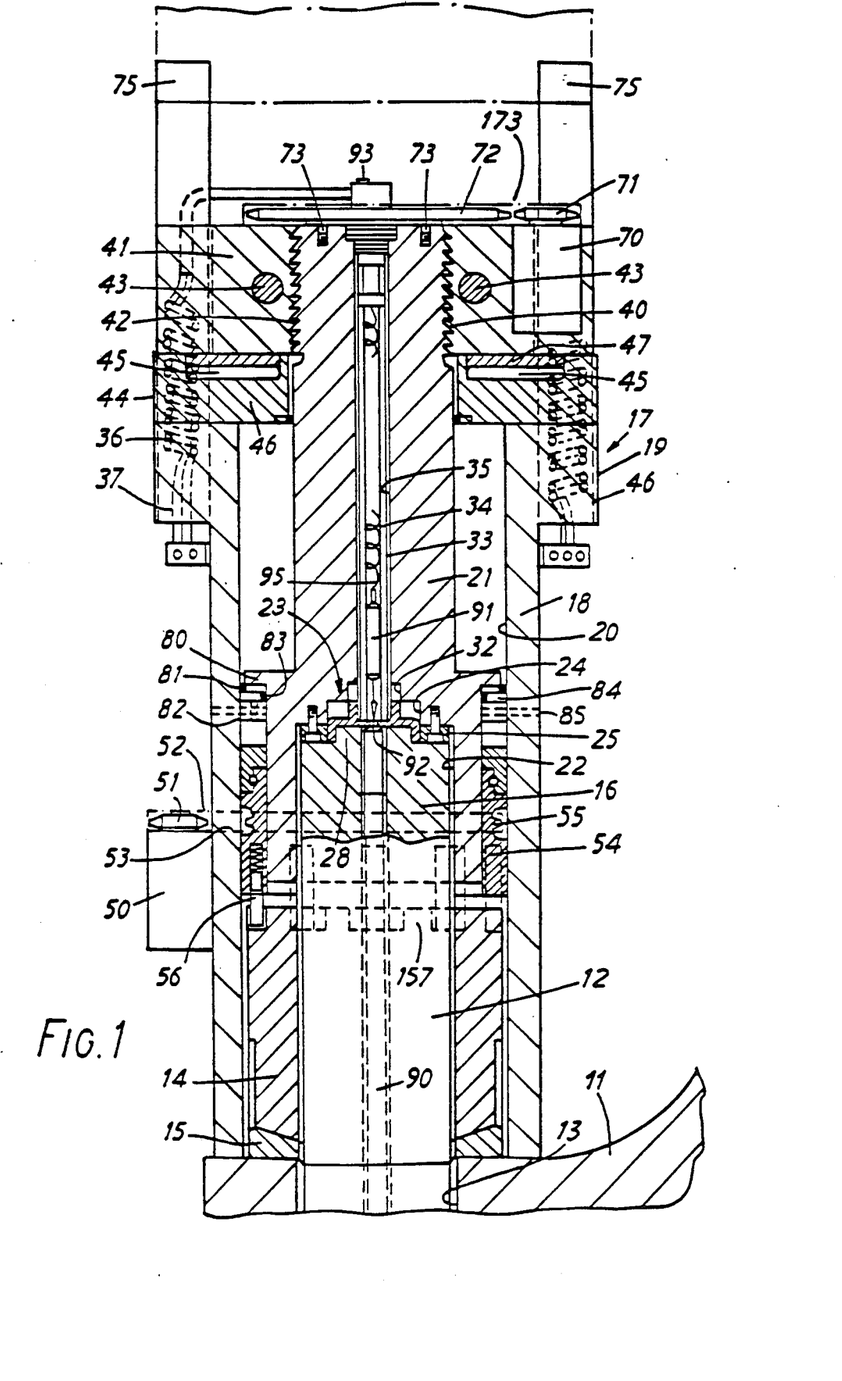
FIG. 1 shows a vertical section through one of the stud tensioners of a multi-stud tensioner in accordance with the invention.
Figure 2:
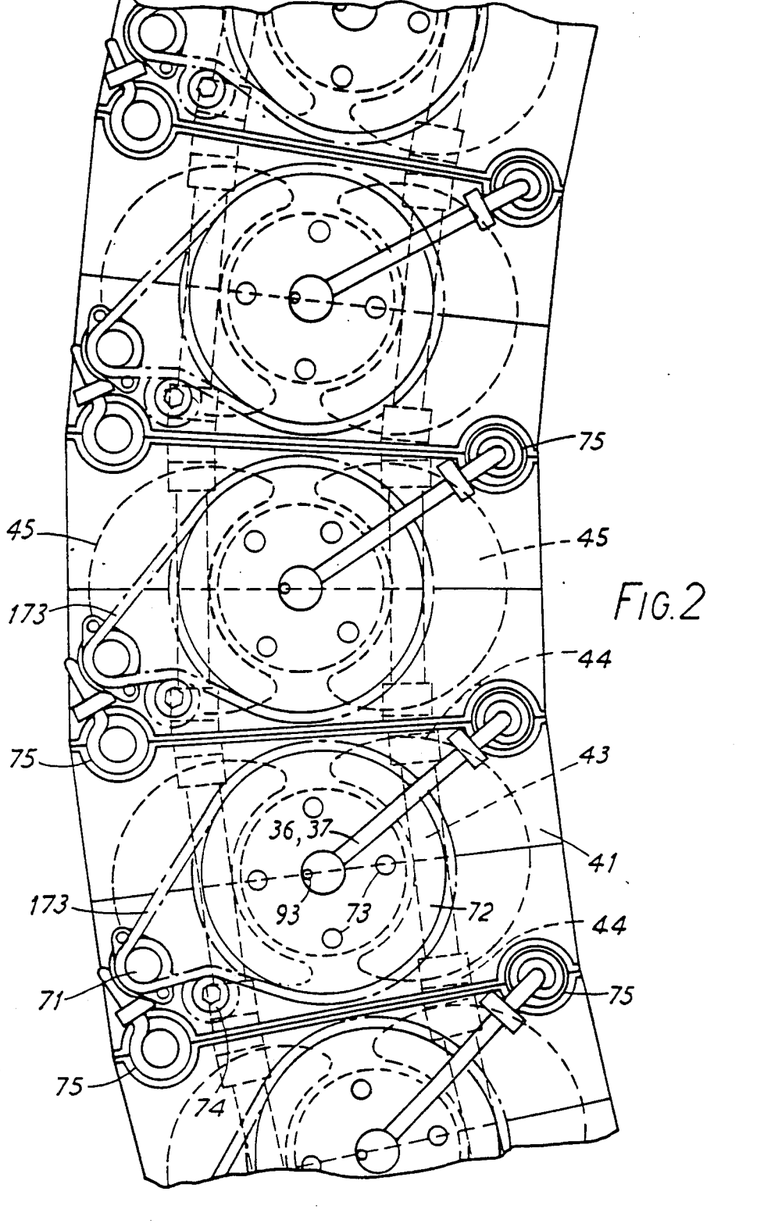
FIG. 2 shows a fragmentary plan view of the multi-stud tensioner of FIG. 1.

A multi-stud tensioner 17 consists of a carousel base ring 18 having a mean diameter equal to the diameter of the pitch-circle for the studs 12 and a radial width approximately 1.8 times the outside diameter of the working nuts 14. The ring 18 is a fabricated or cast steel ring and has an enlarged cross section at its upper end 19. The ring 18 may be made in three arcuate sections bolted together to form a circle.

54 equally-pitched cylindrical bores 20 pass vertically through the ring 18 and align with the studs 12. The bores have a diameter greater than the outside diameter of the working nut 14.

Each bore 20 houses equipment for tensioning a respective one of the studs. The equipment in all of the bores is the same. The equipment in one of the bores will now be described in detail.

A tension bar 21 is fitted into each bore 20 and has at its lower end a screw threaded socket 22 which screws onto the screwed extension 16 of one of the studs 12.

Figure 5:
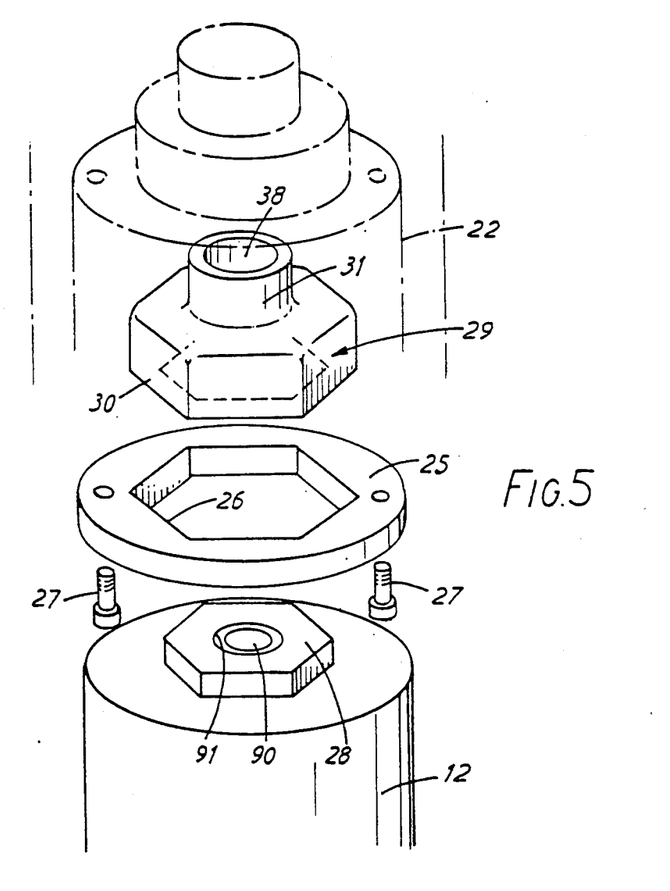
FIG. 5 is an exploded perspective view of the clutch of the multi-stud tensioner of FIGS. 1 and 2.
Figure 6:
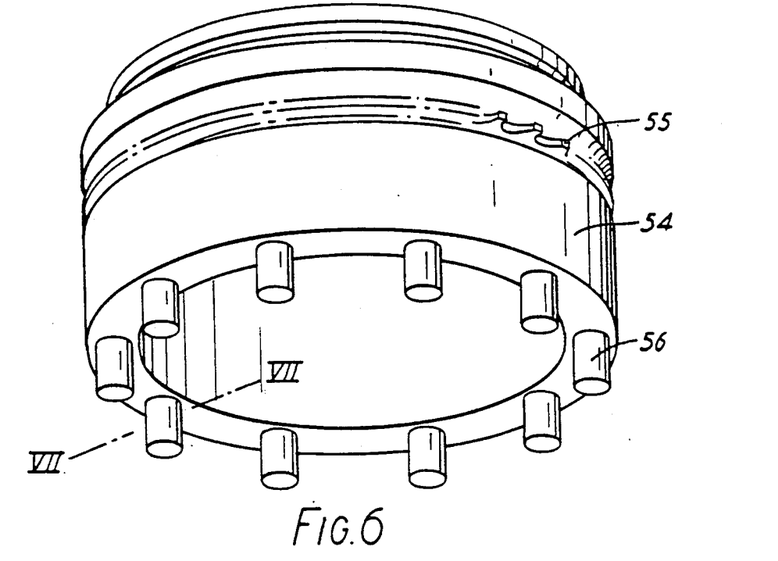
FIG. 6 is a perspective view from below of a dog-clutch of the multi-stud tensioner of FIGS. 1 and 3.

A clutch 23 is housed in a counterbore 24 at the upper end of the socket 22. As can be seen in FIG. 5 a circular plate 25 with a hexagonal central aperture 26 is secured by screws 27 to the base of the socket 22 around the counterbore. A hexagonal boss 28 is machined on the upper end of the stud 12. The diameter between flats of the aperture 26 is greater than the diameter of boss 28 between corners so that the boss can rotate in the aperture. A clutch member 29 has a hexagonal downwardly-projecting rim 30 and a cylindrical upwardly projecting spigot 31. The spigot 31 fits into a bore 32 and the rim 30 fits into the counterbore 24 in the lower end of the tension bar.

The clutch member 29 can be raised and lowered by air pressure as will be described below. In the raised position the clutch member is withdrawn into the counterbore 24 and the bore 32 and the boss 28 can rotate in the aperture 26 so that the tension bar can be turned relative to the stud. In the lowered position the rim of the clutch member enters between the plate 25 and the boss 28. The outside of the hexagonal rim fits the hexagonal aperture 26 and the inside of the rim fits the boss 28 so the clutch member keys the boss to the plate thus locking the stud to rotate with the tension bar.

Figure 3:
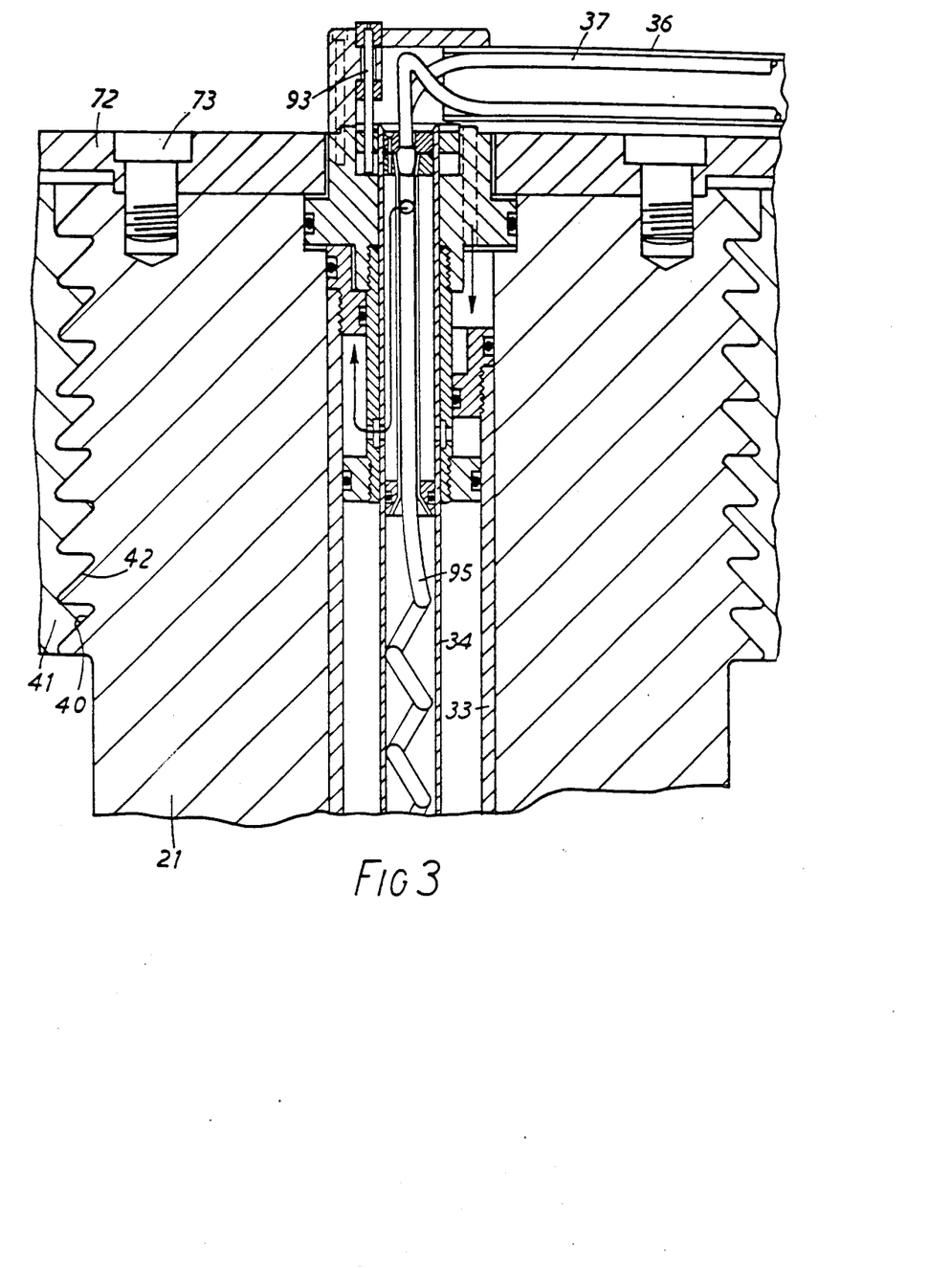
FIG. 3 shows a vertical section on an enlarged scale of the clutch and transducer control of the multi-stud tensioner of FIGS. 1 and 2.
Figure 4:
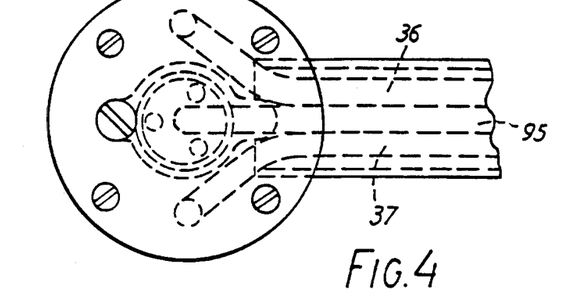
FIG. 4 is a plan view of the clutch and transducer control of FIG. 3.

The air pressure for raising and lowering the clutch member is supplied through two concentric tubes 33 and 34 passing down an axial bore 35 in the tension bar 21. At the upper end the space between the concentric tubes 33 and 34 is connected to a flexible air supply line 36 and the space within the inner tube 34 is connected to a flexible air supply line 37. At the lower end the space between the concentric tubes is connected through an aperture in the side of the outer tube 33 to the bore 32 to apply air pressure to the upper side of the clutch member. The space within the inner tube 34 communicates through a central aperture 38 in the clutch member with the space below of the plate to apply air pressure to the underside of the clutch member. Thus by applying air pressure on the line 36 the clutch member is lowered and the clutch is engaged and by applying air pressure on the line 37 the clutch member is raised and the clutch is disengaged.

The upper end of the tension bar 21 is machined with circumferential buttress grooves 40. The upper side of each groove is substantially horizontal whereas the lower side in inclined. A diametrically split thrust block 41 has matching grooves 42 and is permanently secured around the grooved end of the tension bar 21 by two force fitted bolts 43 tensioned by nuts 44. The grooves 30 and 32 are lubricated with an EP oil so that the tension bar can easily be rotated in the block when the weight of the bar 21 nut 14 and stud 12 are compensated for as described below.

The block 41 rests on a hydraulic tensioning device 44 which in turn rests on the top of the base ring 18. The hydraulic tensioning device consisted of two crescent-shaped hollow totally enclosed elastomeric load cells 45 contained in crescent-shaped recesses in a base block 46. Crescent shaped pistons 47 fit into the recesses above the load cells. Hydraulic fluid is pumped into the load cells through supply pipes (not shown) at a pressure of 14,000 p.s.i. to expand the load cells and force the pistons 47 upwards against the underside of the thrust block 42 with a force of up to 1,000 tons. For further details of the construction of the tensioning device 44 see our patent specification GB-A-No. 1592091. The force on the thrust block 41 is transmitted through the tension bar 21 to the stud 12. The reaction is transmitted through the carousel ring 18 to the upper flange of the reactor pressure vessel thereby stretching the stud 12. The strain of approximately 1.1 mm developed in the stud enables the working nut 14 to be slackened off. With a screw pitch of 3 mm one turn of the nut is sufficient to slacken off the nut completely.

The arrangement for turning the working nut 14 consists of a hydraulic motor 50 with a drive sprocket 51 mounted on the outside of the carousel ring 18. The sprocket 51 is connected by a chain 52 which passes through a slot 53 in the wall of the bore 20 in the carousel ring and around a dog clutch ring 54. The dog clutch ring 54 is mounted to rotate within the bore 20 and has gear teeth 55 machined in its side wall for engagement with the chain. Spring-loaded dogs 56 engaged between castellations 157 on the working nut 14 to lock the dog clutch in rotation with the nut.

Figure 7:
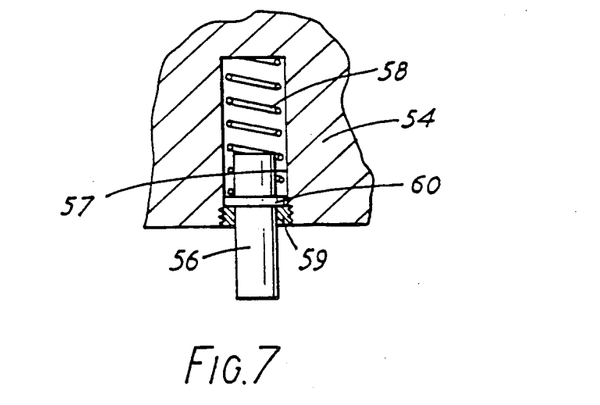
FIG. 7 is a cross-section of a detail of the dog clutch of FIG. 5 on the line VII—VII.

FIG. 7 shows the mounting of one of the dogs in the dog clutch ring. The dog 56 fits into a cylindrical bore 57 in the lower face of the ring 54. A spring 58 is positioned behind the dog and urges the dog downwardly.

A circular retaining ring 59 is screwed into the lower end of the bore 57 and engages against a circular flange 60 on the dog to prevent the dog falling out of the dog clutch ring 54. The resilient mounting of the dogs 56 prevents the dogs damaging the castellations 157 on the working nut if they are not aligned with the recesses between the castellations when the dog clutch ring 54 is lowered onto the nut 14. The spring loaded dogs retract if they collide with the castellations but project again as soon as the motor 60 bring the dogs into register with the recesses.

The drive mechanism for turning the tensioning bar 21 consists of a hydraulic motor 70 mounted on the thrust block 41 with a drive sprocket 71. A chain wheel 72 is secured by screw 73 to the top of the tension bar 21 and a drive chain 173 passes round the drive sprocket 71 the chain wheel 72 and an idler sprocket 74. The reaction torque produced when the motor 70 rotates the tension bar 21 and the stud 12 is taken by guide tubes 75 extending up from the carousel ring 18 between the hydraulic tensioning devices 44 and the thrust blocks 41.

To compensate for the weight of the stud, the working nut and the tension bar whilst the tension bar is being rotated, the tension bar 21 and bore 20 are formed as a piston and cylinder actuated by air pressure. A radial flange 80 is formed on the cylinder and is a close sliding fit in the bore 20. Sliding seals 81 are fitted to the underside of the flange to prevent the escape of air. Below the flange 80, a ring 82 is secured to the wall of the bore 20. The part of the tension bar 21 below the flange is a sliding fit in the ring 81 and a sliding seal 83 is fitted between the ring and the tension arm. Air at a pressure of 38 p.s.i. is introduced into the space 84 between the flange 80 and the ring 82 through passages 85 whenever the tension bar is being rotated to take the weight of the stud, nut and tension bar off the buttress grooves 40 and the screw threads of the reactor flange.

For indicating the strain in the stud 12, the stud is provided with a strain indicator rod 90 which passes with clearance through a central bore in the stud and is secured to the stud at its lower end. When the stud is de-tensioned the top of the indicator rod 90 should be flush with the top of the stud 12.

The strain is measured by a "DIGILINE" electrical inductive strain transducer 91 mounted in the lower end of the tube 34. The transducer 91 has a stylus 92 which touches the top of the strain indicator rod 90 when the clutch is engaged. The zero-setting of the strain transducer is adjusted before the start of the tensioning operation (after refuelling) by means of a screw 93 (see FIG. 3) which alters the position of the anchorage point of the tube 34 and thus the position of the transducer 91.

The electric signals from the transducer are lead out through leads 95.

Operation of the multiple stud tensioner is controlled from a console. The 54 stud manipulating devices are operated in cascade in 6 groups of 9 devices. Within each group the operations of the motors perform their operations in sequence. The completion of an operation by one motor is detected and causes the next motor in its group to start.

Figure 8:
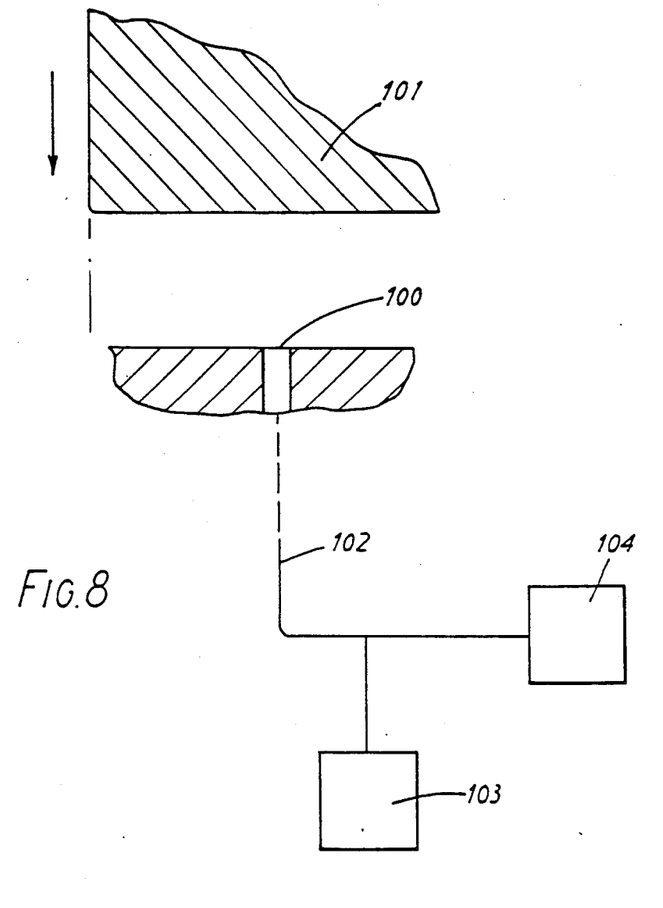
FIG. 8 is a diagram of a pneumatic proximity detector.

The completion of some operation is detected by pneumatic proximity detectors which consist of an appropriately placed aperture 100 (see FIG. 8) fed with air at 5 p.s.i. from a source 104. When a component 101 has been moved into the required position the aperture will be closed by the component 101 causing the pressure in the line 102 supplying the air to rise. This rise in pressure is used to operate a pneumatic switch 103 which starts the next operation.

To remove the studs at the start of a refuelling operation, the multi-stud tensioner is assembled in the parking bay for the reactor and the operations and controls are tested. The assembled tensioner is then transferred from a stand in the parking bay to the top flange of the reactor pressure vessel using a polar crane (not shown).

Once the tensioner is in position the first operation is to screw down the tension bars 21 onto the stud extensions 16.

The motors 70 for the first device in each group are energised to turn the tension bars 21 in a clockwise direction. A pneumatic proximity detector detects the position of each tension bar when it is almost completely screwed down and the hydraulic pressure to the motor is reduced. The motor continues to turn the tension bar but with reduced torque until the motor stalls. The stalling of the motor is detected and causes the second motor 70 in the group to be operated. The process is repeated until all nine tension bars in all six groups have been screwed down. The control then moves to the second operation.

The second operation is to operate engage clutches by applying air pressure on line 36 to lower the clutch member. Again this operation is performed in cascade with each clutch in a group being operated in sequence and the detection of the movement of the clutch by a pneumatic proximity detector causing the next clutch in the group to be energised.

When all the clutches have been operated, the next step is to record the strain readings from the strain transducers 91.

The load cells for all the tensioning devices are then pressurised to 14,000 p.s.i. simultaneously to tension all the studs.

The hydraulic motors 50 are operated in cascade to slacken each working nut anticlockwise one turn. The hydraulic motors in each group operate in sequence with each motor indicating when it has completed the required number of turns before locking out and causing the next motor in the group to start.

The pressure in the load cells is then released simultaneously and the strain readings can be taken again with the studs detensioned to check whether there has been any creep of the studs since the reactor was last refuelled.

The next operation is to unscrew the studs. The clutches are already engaged so operation of the motors 70 in the anticlockwise direction causes the studs to be unscrewed and drawn up into the carousel ring. The motors are again operated in cascade, the position of each stud when withdrawn being detected and caused to operate the next motor in the group.

When all the studs are withdrawn the carousel ring 18 can be lifted off with the studs 12 and working nuts 14 and transferred to the parking bay using the polar crane.

At the parking bay the studs and working nuts are discharged for cleaning and testing. The zero setting of the strain indicator rods is checked and corrected if necessary by grinding the ends of the stud and indicator rods flush with one another.

After the studs and working nuts have been cleaned and tested the position of the underside of working nuts relative to the lower end of the studs is checked with a gauge staff to make sure that when the stud has been screwed down through the nut into the flange of the reactor vessel only about one turn of the nut will be required to tighten the nut. The studs and working nuts are then returned to their correct places on the carousel ring 18. The tension bars 21 are screwed onto the studs 12 and locked in place with the dog clutches. The transducer readings are checked and the zero settings adjusted by means of the screws.

When the reactor has been refuelled, the carousel ring with the studs and working nuts is transferred by the polar crane to the top flange of the reactor vessel. The following sequence of operations is then performed.

The studs 12 are screwed down into the flange of the reactor vessel by operating the motors 70 in cascade to turn the studs clockwise. When each stud is almost home the position of the tensioning bar is detected by a pneumatic proximity detector and the hydraulic pressure in the motor is reduced to reduce the torque. The motor continues to turn the stud until it stalls. Stalling of the motor is detected and used to start the next motor in the group.

When all the studs have been screwed home, the load cells of all the hydraulic tensioning devices are simultaneously pressurised with hydraulic fluid to a pressure of 14,000 p.s.i. to tension the studs.

The working nuts are then screwed down by operating the motors 50 in cascade, each motor turning its nut until it stalls, the stalling of the motor being detected and used to start the next motor in the group.

When all the working nuts have been tightened, the pressure in the load cells is reduced to zero. The residual strain in all the studs is measured by the transducers and displayed on the control console. All the readings should be within a prescribed range, say ±2% of the mean. If they are not a note is made of which studs are outside the range and by how much. The strain is then adjusted as follows.

The control console is provided with 54 three-way switches connecting the control circuits for the 54 working nut rotator motors 50. When a switch lever is in the "UP" position a bus-bar is connected to a solenoid valve which will cause the corresponding motor to run clockwise when a master "inching" control is closed such that only half a turn of the sprocket wheel is made, representing +1% increase in strain. Likewise, when a lever is in the "DOWN" position the corresponding motor will run half a turn anti-clockwise when the master "inching" controller is closed, representing a strain of −1%. When a switch lever is in midposition the corresponding motor will be isolated.

On automatic tension control, the motors will all be switched to clockwise rotation and will follow up the tensioning strain as the pressure builds up to the standard 14,000 p.s.i.

By reducing the pressure to zero the strain indicators will show the residual strain in the studs.

If the estimated tightening load of 14,000 p.s.i. is correct, then 90% of the residual strain readings at zero pressure should be within the ±2% limit. There will be some slightly higher, and some slightly lower. Therefore corrective action must now be taken, as follows:

The three-way switches must now be switched as follows:-
 (a) All studs with residual strains ±2% are isolated, i.e. switch lever to mid-position.
 (b) Any studs with lower strains - switch lever "UP".
 (c) Any studs with higher strains - switch lever "DOWN".

As each operation of the master "inching" switch will produce a rotation of equivalent to only ±1% strain, for the best use of these arrangements the size of the errors must be noted for each of the erroneous stud readings in terms of the number of corrective "inching" starts to be made, i.e. number of 1% errors.

For example, if studs a,b,c,d, have high errors a=+1%; b,c=+2%; d=+3% and studs l,m,n,o,p,q,r have low errors - l,m,n,=−1%; o=−2%; p,q,r,=−3%.

Then he number of "inching" starts which will be required=three "inching" starts, and the action to be taken is as follows.

Firstly all load cells are pressurised to 14,500 p.s.i.

Switches of a,b,c, and d are set "DOWN", and switches of studs l,m,n,o,p,q,r, are set "UP".

The inching master switch is operated to cause the corresponding motors to make half a turn of the drive sprocket in the appropriate directions. Switches a,l,m and n are then set to the middle position to isolate the corresponding motors.

The inching master switch is operated again. This time only the motors b,c,d,o,p,q,r will turn half a sprocket rotation in the appropriate direction. Switches b,c and o are then set to the middle position to isolate the corresponding motors. The inching master switch is then operated for a third time to turn the motors d,p,q and r by half a sprocket in the appropriate direction.

Finally the switches d,p,q and r are set to the middle position and the pressure in the load cells is reduced to zero. The strain readings are checked. They should now be within ±2%. If not the process is repeated.

When the strain in the studs is correctly adjusted the clutch 25 is disengaged, the tension bars 21 are unscrewed from the studs and the multi-stud tensioner can be removed.

It will be appreciated that the entire operation can be completed in a much shorter time than with a single stud tensioner and that the invention thus leads to a considerable saving in expense.

The multi-stud tensioner can be used with new reactor pressure vessels or retrofitted to existing pressure vessels. The operation of the tensioner is semi-automatic and can be effected by remote control from a console. The final trimming of the stud strains to within the tolerance range can be performed simply and quickly.

The parts of the tensioning device which might be damaged in the event of a sudden rise in temperature due to a reactor malfunction, such as the load cells can be quickly replaced (say in less than half an hour).

The use of compensating air pressure reduces the friction on threads and groove to approximately 10% of that produced by the deadweight of the tension bar, stud and working nut.

The line of action of the air pressure on the flange which reduced the load on the grooves and threads, coincides with the centre-line of the stud and thus eliminates eccentric loading which otherwise might cause jamming of the threads.

The spring-loaded dogs of the lower nut rotating mechanism eliminate mechanical damage to the working nuts.

Figure 9:
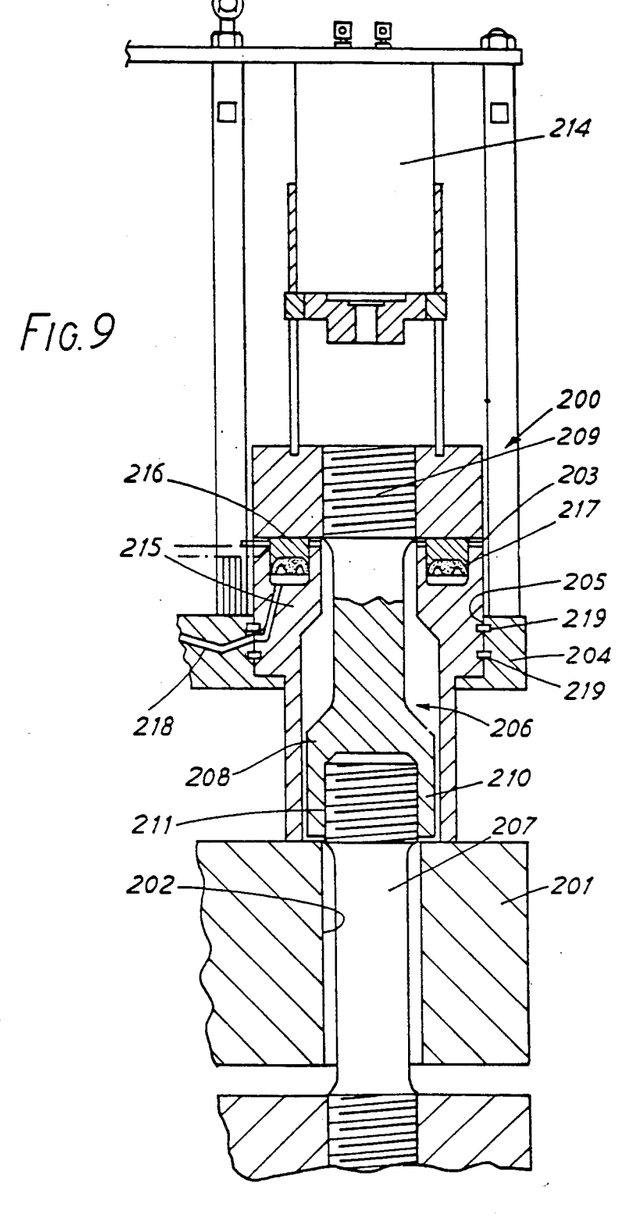
FIG. 9 is a section through a second embodiment of multiple stud tensioner in accordance with the invention.
Figure 10:
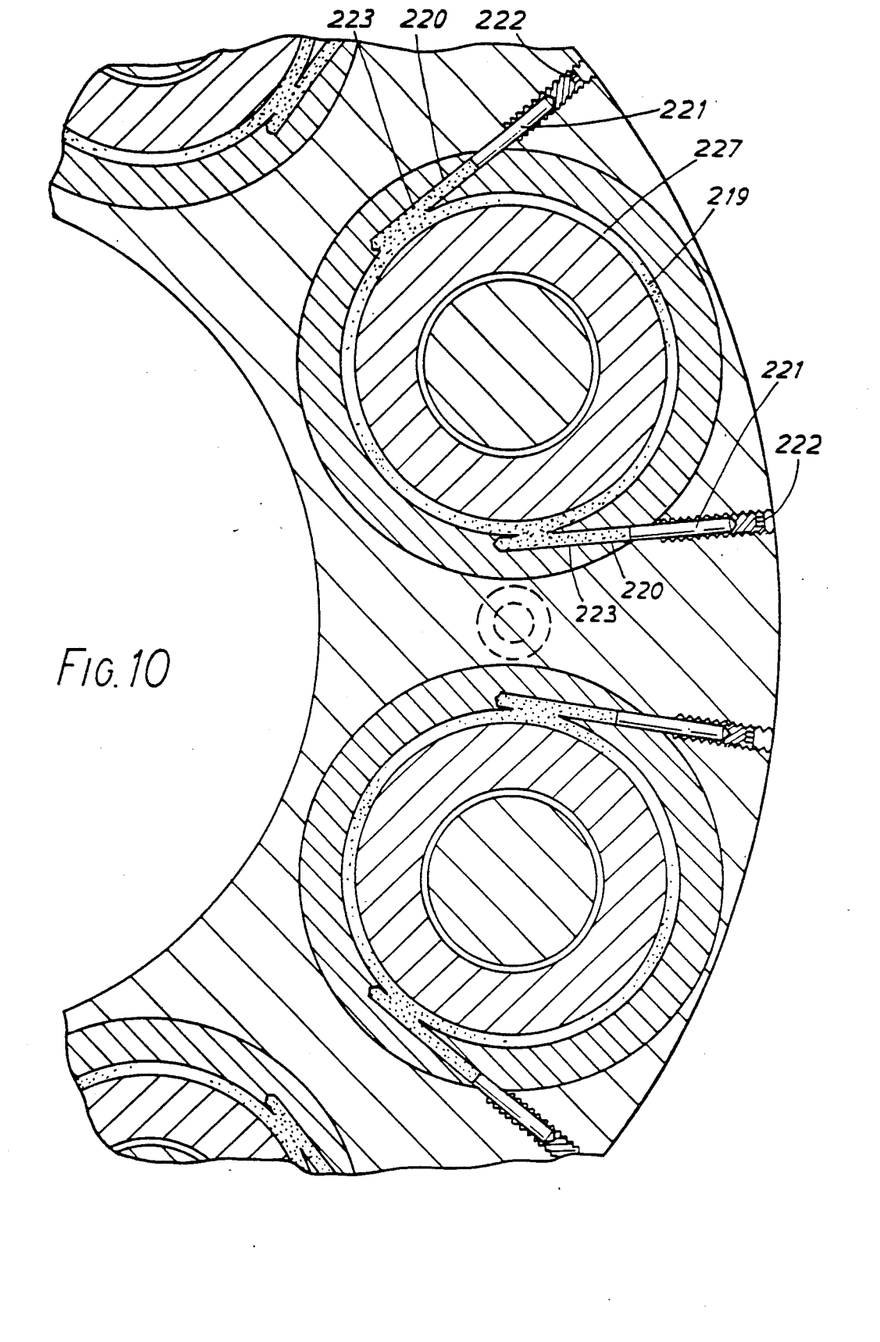
FIG. 10 is a horizontal section through the tensioner of FIG. 9.

Referring now to FIGS. 9 and 10, these show smaller multistud tensioners that can be used for autoclaves and other pressure vessels, primarily for the chemical industry where frequent opening is commonly required - possibly up to 3 times daily.

To save time the multi-stud tensioner 200 is left permanently on the top cover 201.

It is common practice, in these cases, to raise the autoclave vessel upwards on guide bars so that the studs are accurately threaded through the stud holes 202 in the top cover 201. The nuts are then screwed on and the studs are simultaneously tensioned using hydraulic load cells. Finally, the load transfer is made to the tensioner body using castellated shim rings 203 which are rotated one castellation by air actuator (not shown) to fill the straining gap without any significant loss of strain in the tightening strain which is approximately equal to the residual strain.

A top plate 204 is bored with a number of parallel holes 205 on the pitch circle diameter of the autoclave studs and pitch of the tensioners - in the example there are eight tensioners 206 and eight studs 207.

Each stud tensioner 206 has a puller bar 208 screwed thread at its top end to take a top nut 209. The lower end of the puller bar has a screw threaded socket 210 which can be screwed onto the stud threads 211 using a hand-held pneumatic torque wrench (not shown) or small hydraulic motors 214 where there is danger of explosion due to the nature of the chemicals used in the autoclave. In this case the autoclaves are each housed in reinforced concrete bunkers, and the autoclaves must be controlled from the other side of a safety screen wall.

The tensioner body 215 contains the load cell piston ring 216 and seal 217. The body 215 is tapping-fit into the locating holes 205 in the top plate 204. A circumferential 3φ (3 mm diameter) groove 217 connects the manifold drillings 218.

A pair of 2φ circumferential grooves 219 are disposed one above the manifold and the other below it. Two corresponding radially-drilled 3φ holes 220 are tangential to the circumferential 2φ grooves 219 and break into the 2φ grooves 219.

A 1" length of 3φ nitrile rubber 220 is inserted into each of the 4 tangential 3φ holes 223. A piston rod 221 is then inserted, and finally a M5φ socket screw 222. It can be seen that by screwing in the M5φ socket screw 222 nitrile rubber in the holes 223 and also in the 2φ circumferential grooves 224 are also pressurised lengthwise causing it to expand laterally thus sealing off the 3φ circumferential grooves, and forming a most effective seal for the 10,000 p.s.i. hydraulic oil pressure. The advantage of this arrangement is that in the event of damage to any load cell body 215 of the piston ring 225 the joint can be released by removing the screw 222 and the piston rod 221 and drilling out the 3φ nitrile rubber cord 220. This immediately releases the pressure in the 2φ "O"-rings 227 so that the tensioner body 215 can be removed and renewed, if necessary. The top nut 209 will, of course, require unscrewing after removing the locking screw 230.

Thus the invention also provides a simple method for forming a channel between two surfaces.

I claims:

1. A method of tensioning a group of studs to a predetermined strain, comprising the steps of:
   (a) tensioning all the studs simultaneously to a predetermined tension;
   (b) tightening working nuts;
   (c) releasing the tension on the studs;
   (d) measuring the residual strain on the studs and determining for which studs the strain is outside a predetermined tolerance range;
   (e) retensioning the studs to a tension greater than the said predetermined tension;
   (f) rotating the nuts for the studs which are outside the predetermined residual strain tolerance range in step by amounts and in directions corresponding to the amount and direction in which the strain deviates from the predetermined value; and
   (g) releasing the tension on the studs.

2. A method according to claim 1 in which step (f) comprises:
   a first rotation of all the nuts for studs for which the residual strain is outside the tolerance range by the same amount and is directions which correspond to the direction in which the residual strain deviates from the predetermined value and subsequently rotating only those nuts for which the deviation of the residual strain is greater than a particular value.

* * * * *